US006988846B2

(12) United States Patent
Vogt

(10) Patent No.: US 6,988,846 B2
(45) Date of Patent: Jan. 24, 2006

(54) DEVICE FOR ATTACHING A RETAINING MEMBER FOR AN OPTICAL APPARATUS TO A SUPPORT

(76) Inventor: Philippe Vogt, Frohalpstrasse 65, CH-8838 Zurich (CH)

(*) Notice: Subject to any disclaimer, the term of this patent is extended or adjusted under 35 U.S.C. 154(b) by 0 days.

(21) Appl. No.: 10/420,401

(22) Filed: Apr. 22, 2003

(65) Prior Publication Data

US 2003/0194268 A1    Oct. 16, 2003

Related U.S. Application Data

(63) Continuation-in-part of application No. 09/420,290, filed on Oct. 18, 1999, now abandoned.

(51) Int. Cl.
  *B25G 3/08*    (2006.01)
  *F16M 11/02*   (2006.01)
(52) U.S. Cl. .................. 403/299; 403/381; 248/177.1; 248/223.41
(58) Field of Classification Search ............... 403/122, 403/123, 131, 363, 299, 49, 167, 168, 186, 403/230, 384, 396, 381; 396/419, 424, 425, 396/428; 348/373; 248/187.1, 223.41, 177.1 X, 248/223.41 X, 224.51, 224.61
See application file for complete search history.

(56) References Cited

U.S. PATENT DOCUMENTS

| 2,144,602 A | * | 1/1939  | Balmer ................. 248/223.41 |
| 2,615,664 A | * | 10/1952 | Reeves .................... 248/177.1 |
| 3,006,052 A | * | 10/1961 | Stickney et al. ......... 248/177.1 |
| 3,927,315 A | * | 12/1975 | Werry .................... 248/223.41 |
| 4,570,887 A | * | 2/1986  | Banister ................ 248/223.41 |
| 5,428,866 A | * | 7/1995  | Aschow ................. 248/223.41 |

\* cited by examiner

*Primary Examiner*—Daniel P. Stodola
*Assistant Examiner*—Victor MacArthur
(74) *Attorney, Agent, or Firm*—Abelman, Frayne & Schwab

(57) ABSTRACT

A device for attaching a retaining member (1) for an optical apparatus (2) to a support (3) includes a screw (11) for securing the retaining member (1) to the support (3) and having a conical head (13) countersunk in the retaining part of retaining member, and a key connection (12) for aligning the retaining member (1) with the support (3) and secured in place by the screw (11).

3 Claims, 3 Drawing Sheets

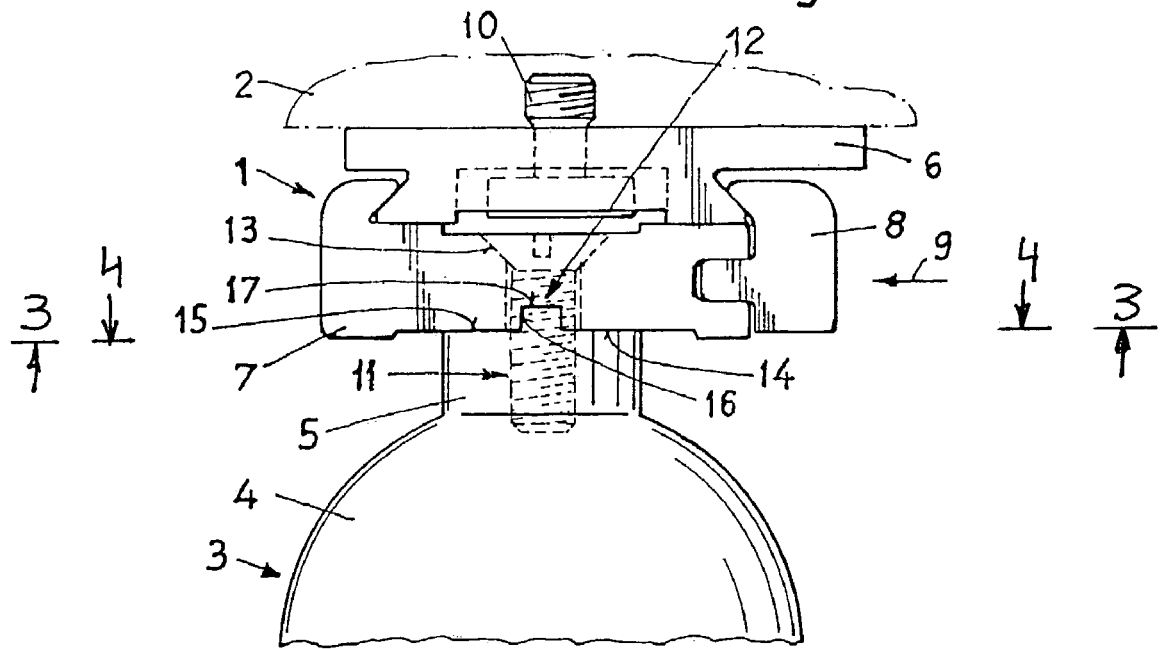
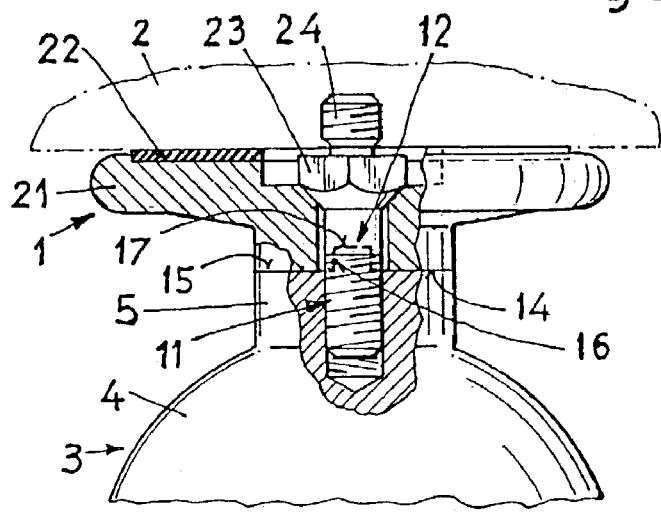

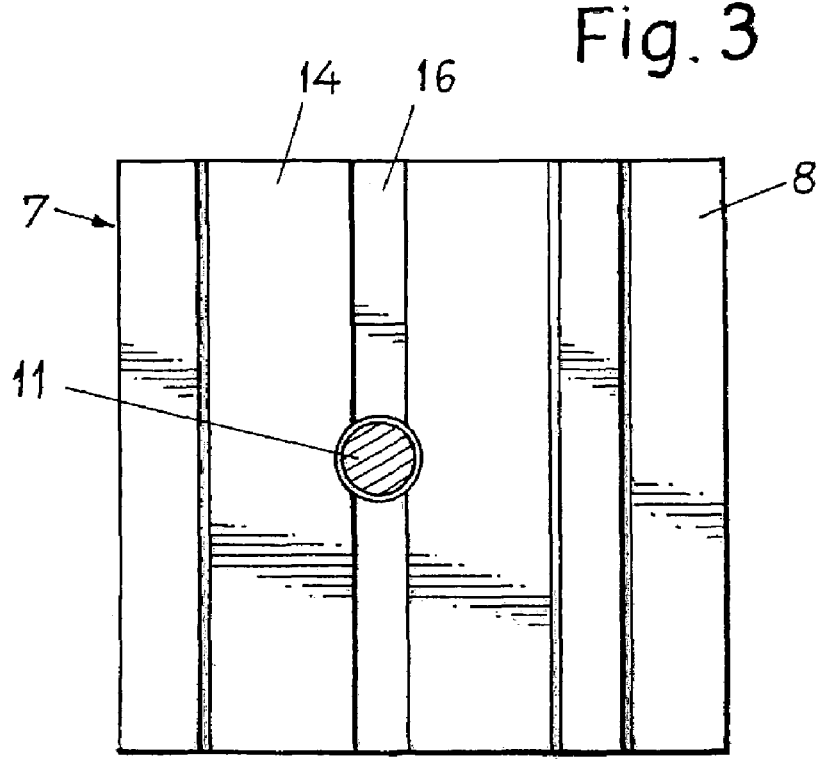
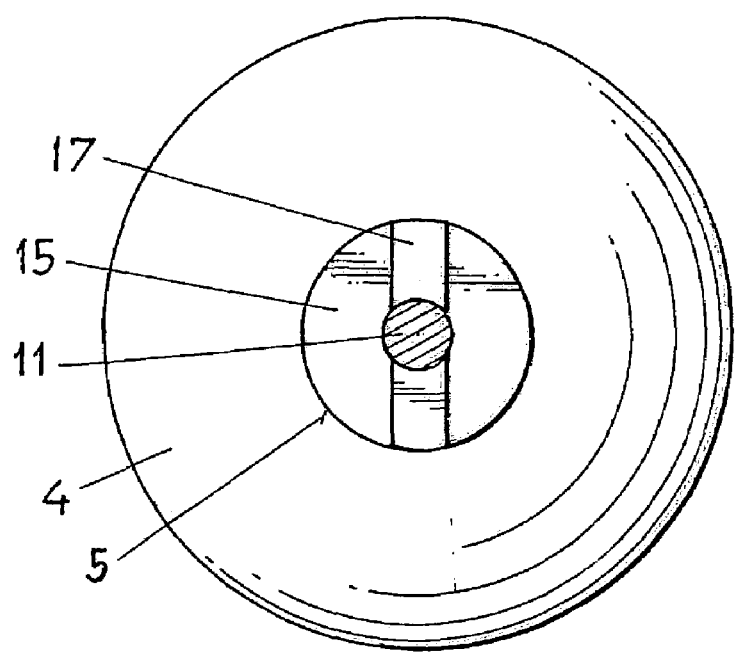

DEVICE FOR ATTACHING A RETAINING MEMBER FOR AN OPTICAL APPARATUS TO A SUPPORT

RELATED APPLICATIONS

This application is a continuation-in-part of application Ser. No. 09/420,290 filed Oct. 18, 1999, now abandoned.

BACKGROUND OF THE INVENTION

1. Field of the Invention

The invention relates to device for attaching a retaining to a support and including a threaded connection between the retaining member and the support.

2. Description of the Prior Art

In known arrangements of this kind, the retaining member is secured to the support by means of a screw connection which contains three fixing screws or, in another embodiment, two screws and a centering pin. The known arrangements each require a careful handling during assembly and positioning of the parts to be connected, as well as a corresponding expenditure of time during the insertion and release of the two or three fixing screws.

The invention is based on the object of providing a further developed arrangement of the initially named kind which is in particular improved in this respect.

SUMMARY OF THE INVENTION

This object is satisfied in accordance with the invention that provides a threaded connection which contains a fixing screw with a screw head countersunk in the retaining member, and by additionally coupling the retaining member with the support by a key connection.

The embodiment in accordance with the invention results in an arrangement in a robust construction substantially simplified in comparison to previous embodiments, with components which can be manufactured at favorable cost and which ensure a simple and reliable handling of the arrangement, which can be achieved with an advantageously low working effort.

BRIEF DESCRIPTION OF THE DRAWINGS

The invention will be explained in the following with reference to the accompanying drawings. The drawings show:

FIG. 1 a side view of an embodiment of device in accordance with the invention;

FIG. 3 a view in the direction of arrows III—III in FIG. 1; and

FIG. 4 a view in the direction of arrows IV—IV in FIG. 1.

DETAILED DESCRIPTION OF THE PREFERRED EMBODIMENT

Figure 1A:
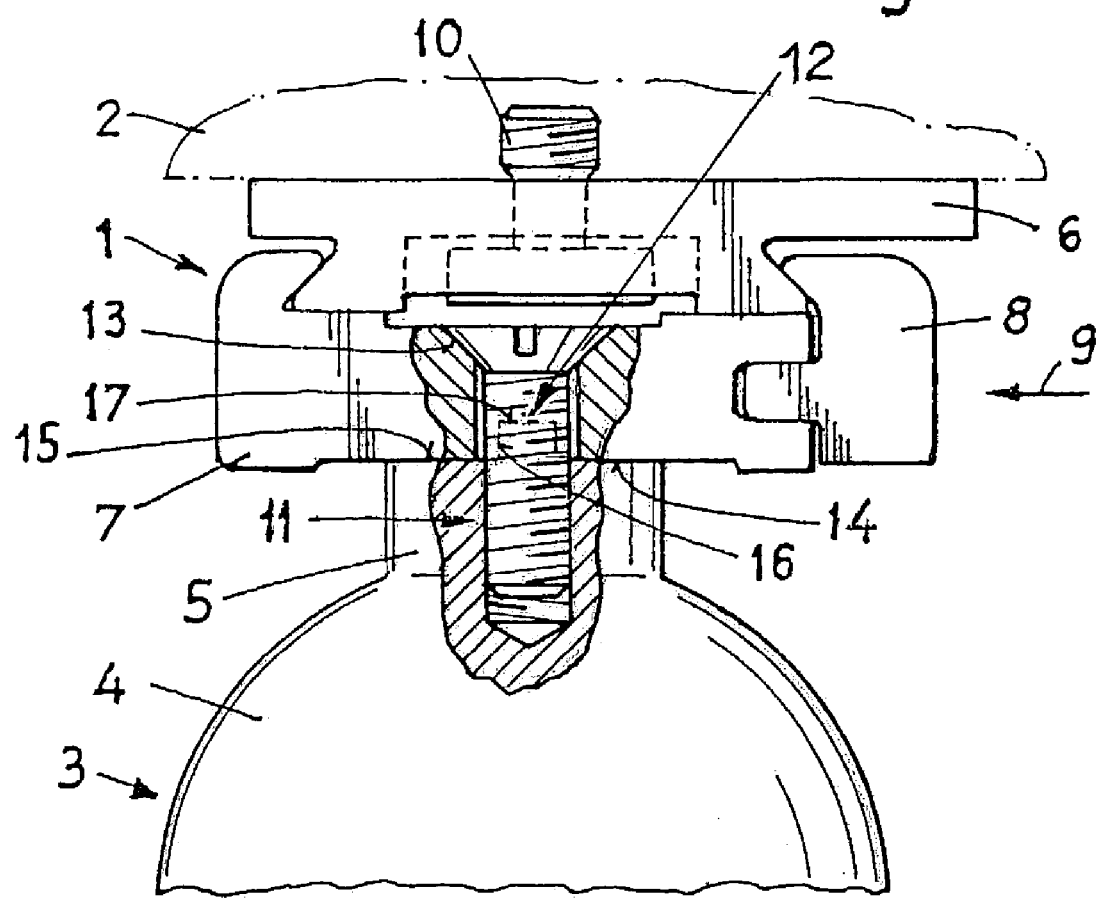
FIG. 1a a side view similar to that of FIG. 1 but showing, in cross-section, the area through which the fixing screw extends FIG. 2 a side view with a partial section of a device in accordance with the invention and in accordance with another embodiment.

The arrangement of FIG. 1 serves for the attachment of retaining member 1 for an optical apparatus indicated in chain-dotted lines to a support 3 which is formed, in accordance with the illustration, by a spherical head 4 with a cylindrical projection 5. The spherical head 4 can be secured in a non-illustrated holder of a stand or the like. In accordance with FIG. 1, the retaining member 1 is formed as a device for the fixing of a guide rail 6 which can be coupled by means of a screw 10 to the optical apparatus 2. The retaining member 1 comprises a first holder part 7 which can be mounted on the support 3 and a second holder part 8 which is movably connected to the latter and which can be clamped via non-illustrated clamping means in the direction of the arrow 9 against the guide rail 6 which is attached to the first holder part 7 and displaceable perpendicular to the plane of the drawing, so that the guide rail is adjustably and fixedly held.

The retaining member 1 and support 3 can be coupled to one another by a screw 11 and a key connection 12. The screw 11 which is formed as a fixing screw has a conical screw head 13 which can be inserted in countersunk manner into a receiving conical bore of the first holder part 7. The screw 11 extends through a smooth bore formed in the holder part 7 and is screwed into a threaded bore formed in of the support 3. The retaining member 1 has a support surface 14 extending transversely to the fixing screw 11 and mountable on a complementary support surface 15 formed on the support 3. The screw head 13 provides for centering of the holder part 7 and, thus, of the retaining member 1, with respect to the support 3 upon the screw 11 being screwed into the threaded bore of the support 3.

The key connection 12 contains a guide groove 16 arranged in one of the support surfaces, in accordance with the disclosed embodiment, in the support surface 14 of the holder member 7, transverse to the axis of the receiving bore, and a strip portion 17 formed on the other complementary support surface 15, which can be brought together with the guide groove 16 in a form-locking manner.

As shown in FIGS. 3–4, the fixing screw 11 extends through the key connection 12, fixing the key connection 12 in place. Fixing of the key connection 12 with the fixing screw 11 permits to increase tolerances of the key connection 12, which substantially facilitates mounting of the retaining member on the support 3.

The arrangement of FIG. 2 corresponds in important parts to that of FIG. 1 with the retaining member 1 in this arrangement being a support part 21 which can be directly coupled to the optical apparatus 2 and which is executed in accordance with the illustration with a plate-like mounting portion. The support part 21 can be provided with a layer 22 of a rubber-like material for the reception of the apparatus 2. As can be seen further from FIG. 2, the screw connection 11 contains a single fixing screw 23 with a screw head, which is of square shape in the illustration, which can be inserted in countersunk manner into the support part 21, which is intended for assembly using a socket wrench and which is provided with a threaded spigot 24 projecting beyond the support part 21. The support part 21 coupled to the support 3 can thus be fixedly screwed to the apparatus 2 via the threaded spigot 24.

In the above described arrangement the retaining member 1 provided with the guide groove 16 will in each case be mounted on the support 3 provided with the strip portion 17 and thus pre-centered. The arrangements of the strip portion 17 and thus pre-centered. The arrangements of the invention thus permit an accurate and reliable positioning of the respective retaining member 1 on the support 3 in a simple manner and ensures simultaneously a coupling or decoupling of the relevant parts which can be obtained with a minimal expenditure of effort and skill.

What is claimed is:

1. A device for supporting an optical apparatus, comprising a support (3) for supporting the optical apparatus; a member retaining the optical apparatus (2) on the support (3) and having a retaining part (6) connectable with the optical apparatus (2) and a holder part (7) connected to the support (3); a fixing screw (11) extending through an axis of symmetry of the device for connecting the holder part (7) with the support (3) and having a conical screw head (13) counter-sunk in the holder part (7) and centering the holder part (7) with respect to the support (3); and a key connection (12) provided between the holder part (7) and the support (3) coaxially with the fixing screw (11) for aligning the holder part (7) and thereby the retaining member (1) with the support (3), the fixing screw (11) extending through the key connection (12) and securing the key connection (12) in place, wherein the holder part (7) comprises a first support surface (14) extending transversely to the fixing screw (11), and the support (3) comprises a second support surface (15) associated with the first support surface (14), and wherein the key connection (12) comprises a guide groove (16) formed in the first support surface (14), and a strip portion (17) which is formed on the second support surface (15) and lockingly engages in the guide groove (16).

2. A device in accordance with claim 1, further comprising means (10) for securing the retaining part to the optical apparatus.

3. A device in accordance with claim 1, wherein the retaining part further comprises a further holder part (8) located laterally of the holder part (7), securable thereto, and forming therewith a dovetail groove in which a dovetail projection, which is provided on the retaining part (6), is received.

* * * * *